United States Patent [19]

Coscia

[11] Patent Number: 4,560,596
[45] Date of Patent: Dec. 24, 1985

[54] DECORATIVE TRIM STRIPS AND PROCESS FOR MAKING THE SAME

[75] Inventor: Charles M. Coscia, Upper Arlington, Ohio

[73] Assignee: The D. L. Auld Company, Columbus, Ohio

[21] Appl. No.: 612,515

[22] Filed: May 21, 1984

[51] Int. Cl.$^4$ .............................................. B60R 13/04
[52] U.S. Cl. ....................................... 428/31; 52/716;
264/212; 293/128; 428/124
[58] Field of Search ..................... 428/31, 121, 124;
52/716; 293/1, 128; 264/212, 299

[56] References Cited

U.S. PATENT DOCUMENTS

| | | | |
|---|---|---|---|
| 3,745,056 | 7/1973 | Jackson | 428/31 X |
| 3,843,475 | 10/1974 | Kent | 428/31 X |
| 3,914,482 | 10/1975 | Sawa et al. | 428/31 |
| 4,010,297 | 3/1977 | Wenrick | 428/31 |
| 4,139,654 | 2/1979 | Reed | 427/44 |
| 4,220,681 | 9/1980 | Narita | 428/31 |
| 4,296,155 | 10/1981 | Madonia et al. | 428/31 |
| 4,349,592 | 9/1982 | Nussbaum | 428/31 |
| 4,353,858 | 10/1982 | Gilleo et al. | 428/187 X |
| 4,356,617 | 11/1982 | Coscia | 428/913.3 X |
| 4,409,269 | 10/1983 | Gilleo et al. | 428/187 X |
| 4,446,179 | 5/1984 | Waugh | 428/31 |

Primary Examiner—Henry F. Epstein
Attorney, Agent, or Firm—Killworth, Gottman, Hagan & Schaeff

[57] ABSTRACT

Trim strips are provided for decorating automobile doors and the like. The trim strips are of generally rectangular shape and have a length longer than the width of the door that is to be decorated. The trim strip includes a foil member whose upper surface is provided with a decorative pattern. A partial section of the upper surface of the foil member bears a weather-resistant and impact-resistant plastic overlay having radiused edges and providing a lens effect to the foil member. The plastic overlaid section of the foil member is essentially coextensive with the width of the door to be decorated. When the trim strips of the invention are applied to a door, the uncoated ends of the foil member are wrapped around the door edges and bonded to the door's underside.

18 Claims, 8 Drawing Figures

DECORATIVE TRIM STRIPS AND PROCESS FOR MAKING THE SAME

BACKGROUND OF THE INVENTION

The present invention relates to generally rectangularly shaped decorative trim strips of the type attached to automobile doors and the like for decoration.

Trim strips of various configurations have been used in the automotive industry to decorate and protect the surfaces of an automobile, especially the body side surfaces. In recent years, emphasis has been placed on replacing chromed metallic moulding strips with improved plastic trim strips which do not corrode and can be adhesively attached to the automobile body without fasteners. There are a number of examples of such trim strips in the patent literature.

Madonia, U.S. Pat. No. 4,296,155 (1981), discloses a decorative body side moulding in which a decorative strip is laminated to an extruded strip of a pliable material and the two strips are overcoated with a weather-resistant coating of acrylic monomer.

Narita, U.S. Pat. No. 4,220,681 (1980), teaches a trim in which a thin metal layer is laminated to a plastic substrate and coated with a soft PVC resin provided with a matte surface.

Wenrick, U.S. Pat. No. 4,010,297 (1977), discloses a composite trim strip made up of two adhesively bonded non-coextensive longitudinal body portions, one body portion being wider than and adapted to receive the other body portion. The body portions are assembled and attached to the side of an automobile using elastomeric adhesives which serve to distribute impact.

Sawa et al, U.S. Pat. No. 3,914,482 (1975), illustrates a moulding wherein a reflective layer is deposited on a rigid synthetic resin base which is coated with a clear synthetic resin layer and overcoated with a protective layer of synthetic resin of uniform thickness.

Kent, U.S. Pat. No. 3,843,425 (1974), relates to a decorative trim having a longitudinal passage therethrough which is filled or coated with a decorative material such as a paint. The trim is formed with a shallow channel on its underlying surface which carries adhesive.

Waugh, U.S. Pat. No. 4,446,179 (1984), assigned to the same assignee as the present invention, discloses a decorative trim strip which may consist of an elongate decorative foil member having thereon an impact-resistant overlay having radiused edges and providing a lens effect to the foil member. An adhesive is used to bond the trim strip to the surface to be decorated.

Notwithstanding the growing usage of such trim strips, their usage presents certain problems. For one, when used to decorate a specified area such as the width of a door, the trim strip must be positioned quite precisely to provide an aesthetically pleasing appearance. If not positioned precisely, one end of the door exterior is not decorated and the overlap on the other end must be hand trimmed to remove the overlap. A second problem encountered is that the end of the trim strip may delaminate by accident or action of vandals and give an unsightly appearance. For these and other reasons, there is a need for improved decorative trim strips.

SUMMARY OF THE INVENTION

It is the principal object of the present invention to provide improved decorative trim strips for use on automobile doors and the like and which are free of certain shortcomings of presently used decorative trim strips.

The improved trim strips are of generally rectangular shape and have a length longer than the width of the door that is to be decorated. The trim strip includes a foil member whose upper surface is provided with a decorative pattern. A partial section of the upper surface of the foil member bears a weather-resistant and impact-resistant plastic overlay having radiused edges and providing a lens effect to the foil member. The plastic overlaid section of the foil member is essentially coextensive with the width of the door to be decorated.

When the trim strips of the invention are applied to the door, the uncoated ends of the foil member are wrapped around the door edges and bonded to the door's underside. It is readily seen that no end of the trim strip is present on the door surface and thus subject to delamination. In addition, since the ends of the trim strip are wrapped around the door edges, the precise placement of the trim strip is not as critical as is the case with presently employed trim strips.

DETAILED DESCRIPTION OF THE PREFERRED EMBODIMENTS

Figure 1:
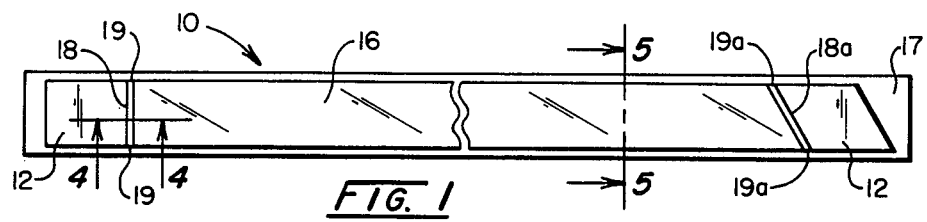
FIG. 1 is a plan view of the decorative trim strip of the invention.

The decorative trim strip identified as 10 in FIG. 1 is of a generally rectangular shape and includes a foil member 12 having a length greater than the length of the surface ultimately to be decorated with trim strip 10. The upper surface of foil member 12 will be provided with a suitable decorative pattern not shown in the drawings. The lower surface of foil member 12 has a layer of adhesive 14 bonded thereto for ultimate use in bonding the trim strip 10 to the surface to be decorated. A stripable paper sheet 17 protects adhesive layer 14 until it is removed by the ultimate user. A partial section of trim strip 10 bears a weather-resistant and impact-resistant plastic overlay 16 having radiused edges which provides a lens effect to the foil member. The plastic overlay 16 has a length which is essentially coextensive with the length of the surface ultimately to be decorated.

Figure 4:
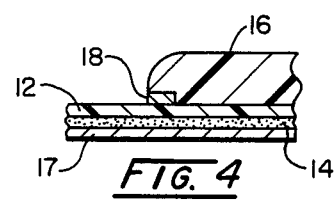
FIG. 4 is a view of the preferred embodiment taken through line 4—4 of FIG. 1.
Figure 7:
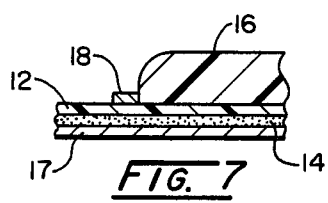
FIG. 7 is a view of another embodiment of the invention as taken through line 4—4 of FIG. 1.

The trim strip 10 illustrated in FIGS. 1, 4, 5, and 7 has two thin, narrow, rectangularly shaped essentially transparent elements 18 and 18a coated on or bonded to and overlaying the upper surface of foil member 12. In one embodiment, the transparent elements 18 and 18a may have sharply defined peripheral edges which serve as the effective edges to stop plastic flow as will be explained further below (FIG. 4). In another embodiment, the transparent elements are made up of a coating of material which the plastic will not wet also so as to form effective edges as will be explained further below (FIG. 7). The major dimension of each of the elements 18 and 18a is aligned generally transverse to the major dimension of foil member 12. The shorter edges 19 of element 18 and the shorter edges 19a of element 18a are aligned in register with the longer edges of foil member 12. For reasons subsequently discussed, the longer edges of foil member 12 have sharply defined peripheral edges.

Figure 5:
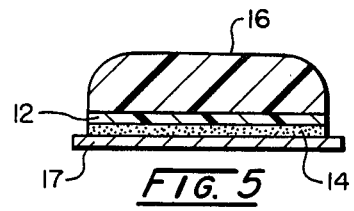
FIG. 5 is a view taken through line 5—5 of FIG. 1.

As illustrated in FIGS. 4 and 5, the plastic overlay 16 has radiused edges which provides a lens effect to improve the aesthetics of the trim strip. The manner in which the radiused edges are formed is described subsequently.

Figure 2:
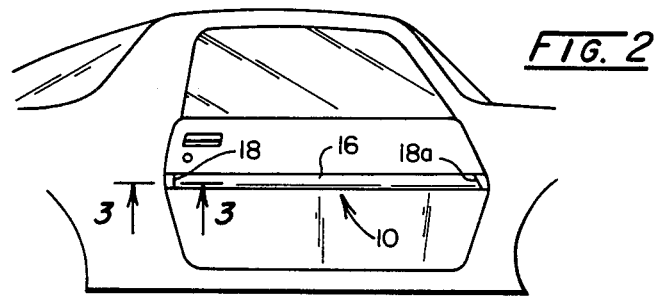
FIG. 2 is a view of the decorative trim strip of FIG. 1 attached to an automobile door.
Figure 3:
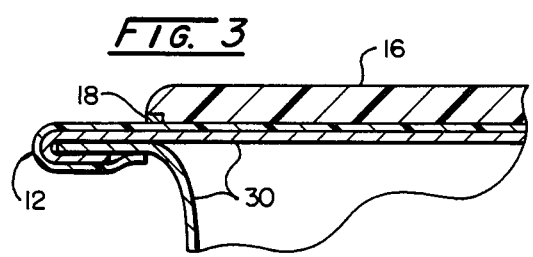
FIG. 3 is a view taken through line 3—3 of FIG. 2.

FIG. 2 illustrates the manner in which trim strip 10 is mounted on the door of an automobile. It will be noted that trim strip 10 is mounted so that the transparent element 18a is positioned just inside the right-hand edge of the door surface with transparent element 18 being positioned just inside the left-hand edge of the door surface. As illustrated in FIG. 3, the right-hand edge of foil member 12 is wrapped around the metal surface 30 of the door and is firmly bonded to the underside of the door. In a like manner, but not shown, the left-hand edge of foil member 12 also is wrapped around and bonded to the underside of the door.

Figure 6:
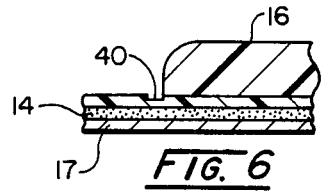
FIG. 6 is a view of another embodiment of the invention as taken through line 4—4 of FIG. 1.

FIG. 6 illustrates a trim strip of modified construction. In lieu of having thin transparent elements mounted on the upper surface of foil member 12, narrow depressions 40 are provided in the upper surface of the foil member and are aligned generally transverse to and extending completely across the major dimension of the foil member. The inner edges of the depressions have as effective edges sharply defined peripheral edges. The plastic overlay 16 terminates at the inner edges of the depressions 40.

Figure 8:
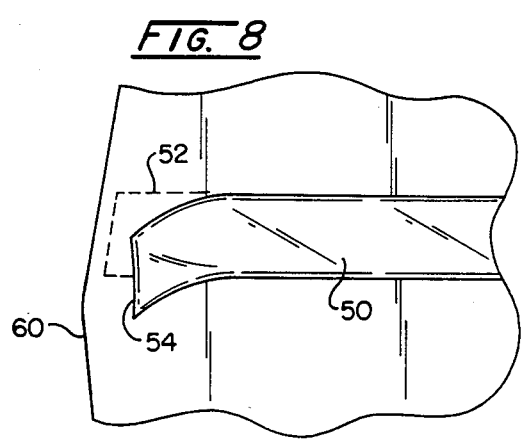
FIG. 8 is a view showing the manner in which a prior art trim strip can be lifted from a surface to which it is bonded.

FIG. 8 illustrates a prior art construction in which a plastic trim strip 50 is mounted on a surface 60 such as an automobile door. The phantom lines 52 illustrate the original position occupied by trim strip 50. By reason of an accident, weathering or an act of vandalism the edge 54 of the trim strip has delaminated from surface 60. It is apparent that such a delamination is unsightly and will require repair. The repair will be troublesome as a minimum in that it will be difficult to apply a suitable quantity of an appropriate adhesive only within the area defined by phantom lines 52.

By contrast, an edge delamination of the type shown in FIG. 8 is unlikely to occur with the construction of the invention as illustrated in FIG. 3. First, when the automobile door is in its normal closed position, the edges of the trim strip are not exposed. If any delamination takes place on the underside of the door, the repair is facilitated without marring the exposed exterior surface since the repair will be made on the unseen inner surface of the door.

The foil member of the trim strip may be a metal foil such as aluminum foil, a plastic foil fabricated from polyethylene terephalate (e.g., Mylar film), polyvinyl chloride or the like, metalized plastic foils and paper-backed foils. The foil member may take various forms; for example, it may be a strip of metal foil which may be embossed to provide a visual effect. Otherwise, the foil member may be a plastic foil strip which is printed or silk-screened with a decorative design, painted or tinted.

A partial section only of the top surface of the foil member will be overlaid with a weather-resistant and impact-resistant clear plastic having radiused edges which provides a lens effect to the foil member. The length of the overlaid section may be essentially coextensive with the length of the surface that ultimately is to be decorated.

To obtain the radiused effect in the plastic cap (element 16 in the drawings) the area of foil surface to be overlaid is provided with effective edges. The longer edges of the foil member, when cut to the size employed, have sharply defined peripheral edges which serve as the effective edges. To provide the generally transversely aligned effective edges in the embodiment illustrated in FIGS. 1, 3 and 4 in the preferred embodiment, thin, narrow, rectangularly shaped transparent elements having sharply defined peripheral edges are bonded to the top surface of the foil member. Strips of Mylar film or other transparent plastic film are preferred and are bonded to the foil surface with a clear transparent adhesive. The transparent elements are positioned so that the shortest edges of the transparent element are aligned in register with the longer edges of the foil member.

In an alternative embodiment as shown in FIG. 7, a material which the liquid, uncured plastic to be cast thereon will not readily wet may be used for elements 18 and 18a. Such materials are disclosed in Reed, U.S. Pat. No. 4,139,654, owned by the same assignee as the present invention, and Gilleo, U.S. Pat. No. 4,409,269. The essentially non-wettable material may be coated on, in the same strip pattern disclosed for the plastic strip of the preferred embodiment, by, for example, a silk screen operation.

To provide the effective edges in the embodiment illustrated in FIG. 6, depressions with sharply defined peripheral edges are cut and/or embossed in the top surface of the foil member and extend completely across the major dimension of the foil member.

The cast plastic used to overlay the top surface of the foil member preferably is a thermosetting material which is weather-resistant and does not yellow or cloud as a result of prolonged exposure to sunlight and which withstands strong detergent. The cast plastic should also be resistant to abrasion and impact. A number of plastics can be used for this purpose, but one which is particularly advantageous because it satisfies all of the above needs is an impact-resistant polyurethane. One polyurethane useful in the present invention is the reaction product of polypropylene glycol and an aliphatic diisocyanate. Other plastics, such as acrylics and epoxies also may be used. In one embodiment, a relatively soft, flexible, weather-resistant polyurethane generally characterized by a Shore D hardness in the range of 45 to 65 and preferably 45 to 55 is used. Such materials are known and various ones can be used in the invention. One that is particularly useful is the reaction product of (a) a mixture of a polyester glycol and low-to-medium molecular weight polypropylenetriols, and (b) an aliphatic diisocyanate-polypropylenetriol adduct.

The curable liquid plastic is applied while the foil member is retained in a substantially horizontal (i.e., flat) plane. The plastic flows to effective edges (which are the sharply defined peripheral edges of foil member 12, the back edges of elements 18 and 18a when those elements are a strip of plastic film, or the front edge of elements 18 and 18a, when those elements are an essentially non-wettable material coated on the substrate, or front edges formed by depressions 40) and then forms radiused edges. The coating then is cured or otherwise hardened to form the overlay. The plastic composition preferably is cured by heat or ultraviolet radiation. Depending on the plastic used, other means such as R.F. heating and air drying may be used to harden the plastic material.

A preferred process for preparing the trim strip illustrated in FIGS. 1, 4 and 5 typically consists of first adhesively bonding the foil member to a paper carrier sheet provided with a release coating. Typically, the foil member will be 0.003–0.10 inch thick, the adhesive layer will be about 0.005 inch thick, and the paper carrier sheet will be about 0.007 inch thick. The carrier sheet will be paper impregnated with a polyethylene resin and having a silicon release agent provided over the polyethlyene coated surface. The assembly of these elements is then printed to provide a series of decorated, rectangularly shaped strips on each sheet of the assembly. In the next step of the operation, the thin transparent elements are laid transversely across the major dimension of the top surface of the printed strips. The transparent elements typically will be 1/16 inch wide, will be approximately 0.003 inch thick and will bear a layer of clear adhesive approximately 0.005 inch thick to bond the strip elements to the foil surface. The elements as laid down will extend completely across the top surface of the printed strips. The blank as described above is then passed through a kiss-cut roll in registry with the printed design. By removing the selvage, a series of partially formed trim strips are provided on the support sheet. The assembly then is passed through a casting station in which a fluid plastic such as polyurethane is laid down as an overlay on the top surface of the trim strip. An overlay having radiused edges which provides a lens effect is obtained as the plastic flows to the cut edges of the foil member and the overlaid transparent elements, stops and forms a positive meniscus. The plastic material is laid down to provide a depth within a range of about 0.040 to 0.50 inch. The assembly then is passed through a curing station where the plastic overlay is cured. The precise curing conditions employed will depend upon the nature of the plastic employed and typically will be about 25 minutes at 150° F.

While the invention has been described in detail and by reference to specific embodiments thereof, it will be apparent that numerous modifications and variations are possible without departing from the scope of the appended claims.

What is claimed is:

1. A decorative trim strip to overlay a specified area of the surface of an article to be decorated and consisting essentially of:
   (a) a generally rectangularly shaped decorative foil member having a length longer than the surface to be decorated, a lower surface, and an upper surface provided with a decoration,
   (b) a partial central section of the upper surface of said foil member bearing a weather-resistant and impact-resistant plastic overlay having radiused edges and providing a lens effect to said decoration,
   (c) end sections of the upper surface of said foil member on each side of said partial central section having no overlay thereon, and
   (d) the plastic overlaid partial central section of said foil member being essentially coextensive with the length of the surface of the article to be decorated and the end sections which are not overlaid with said plastic overlay serving as one means for securing said trim strip to the intended surface.

2. The decorative trim strip of claim 1 in which the plastic overlay is an abrasion-resistant and impact-resistant polyurethane.

3. A decorative trim strip to overlay a specified area of the surface of an article to be decorated and consisting essentially of:
   (a) a generally rectangularly shaped decorative foil member having a length longer than the surface to be decorated, a lower surface, and an upper surface provided with a decoration,
   (b) the two longer edges of said foil member having as effective edges sharply defined peripheral edges,
   (c) two thin, narrow, rectangularly shaped essentially transparent elements overlaying said foil member,
   (d) said transparent elements also providing effective edges,
   (e) the major dimensions of said transparent elements being aligned generally transverse to the major dimension of said foil member,
   (f) the shorter edges of said transparent elements being aligned in register with the longer edges of said foil member,
   (g) the outer edges of said transparent elements being positioned interiorly of the outer edges of said foil member and defining a length of said foil member which is essentially coextensive with the length of the surface of the article to be decorated,
   (h) the upper surface of said foil member bearing a weather-resistant and impact-resistant overlay having radiused edges and providing a lens effect to said decoration and formed by overcoating the upper surface of said foil member with a fluent clear plastic material which flows to all effective edges and forms a positive meniscus and curing said plastic material, and
   (i) end sections of said foil member between said outer edges of said transparent elements and said outer edges of said foil member having no overlay thereon whereby said end sections serve as one means for securing said trim strip to the intended surface.

4. The decorative trim strip of claim 3 wherein said foil member has a layer of adhesive on said lower surface for securing said trim strip to the surface of the article to be decorated.

5. The decorative trim strip of claim 4 wherein said plasic is an abrasion-resistant and impact-resistant polyurethane.

6. The decorative trim strip of claim 3 wherein said foil member is metal foil, plastic foil, or metallized plastic foil.

7. The decorative trim strip of claim 3 wherein said transparent elements are plastic film strips having sharply defined peripheral edges which have been bonded to said foil member.

8. The decorative trim strip of claim 3 wherein said transparent elements are strips of essentially non-wettable material which have been coated on said foil member.

9. A process for preparing a decorative trim strip to overlay a specified area of the surface of an article to be decorated comprising:
   (a) forming an elongated foil member characterized in that;

(i) said foil member has a lower surface and an upper surface provided with a decoration, (ii) said foil member has a length longer than the surface to be decorated, (iii) the two longer edges of said foil member have as effective edges sharply defined peripheral edges, (iv) two thin, narrow, rectangularly shaped essentially transparent elements are applied and overlay said foil member, (v) said transparent elements also providing effective edges, (vi) the major dimensions of said transparent elements are aligned generally transverse to the major dimension of said foil member, (vii) the shorter edges of said transparent elements are aligned in register with the longer edges of said foil members, and (viii) the outer edges of said transparent elements are positioned interiorly of the outer edges of said foil member and define a length of said foil member which is essentially coextensive with the length of the article to be decorated, (b) casting a fluent clear plastic material onto said foil member while said foil member is retained in a substantially flat condition such that said plastic flows to all effective edges and forms a positive meniscus;

(c) leaving end sections of said foil member between said outer edges of said transparent elements and said outer edges of said foil member free of any cast fluent plastic material whereby said end sections serve as one means for securing said trim strip to the intended surface, and (d) curing said plastic composition.

10. The process of claim 9 wherein said transparent elements are plastic film strips having sharply defined peripheral sides and bonded to said foil member.

11. The process of claim 9 wherein said transparent elements are strips of essentially non-wettable material which are coated on said foil member.

12. A decorative trim strip to overlay a specified area of the surface of an article to be decorated and consisting essentially of:

(a) a generally rectangularly shaped decorative foil member having a length longer than the exterior surface to be decorated, a lower surface and an upper surface provided with a decoration, (b) the two longer edges of said foil member having as effective edges sharply defined peripheral edges, (c) two narrow depressions in said foil member aligned generally transverse to and extending completely across the major dimension of said foil member, (d) the inner edges of said depressions having sharply defined peripheral edges so as to provide effective edges, (e) said depressions being positioned interiorly of the outer edges of said foil member with the inner edges of said depressions defining a length of said foil member which is essentially coextensive with the length of the article to be decorated, (f) the upper surface of said foil member bearing a weather-resistant and impact-resistant overlay having radiused edges and providing a lens effect to said decoration and formed by overcoating the upper surface of said foil member with a fluent clear plastic material which flows to all effective edges and forms a positive meniscus and curing said plastics material, and (g) end sections of said foil member between said inner edges of said depressions and said outer edges of said foil member having no overlay thereon whereby said end sections serve as one means for securing said trim strip to the intended surface.

13. The trim strip of claim 12 wherein said foil member has a layer of adhesive on said lower surface for securing said trim strip to the surface of the article to be decorated.

14. The trim strip of claim 12 wherein said plastic is an abrasion-resistant and impact-resistant polyurethane.

15. The trim of claim 12 wherein said foil member is plastic foil.

16. A process for preparing a decorative trim strip to overlay a specified area of the surface of an article to be decorated comprising:

(a) forming an elongated plastic foil member characterized in that;

(i) said foil member has a lower surface and an upper surface provided with a decoration, (ii) said foil member has a length longer than the surface to be decorated, (iii) the two longer edges of said foil member have as effective edges sharply defined peripheral edges, (iv) said foil member has two narrow depressions therein generally transverse to and extending completely across the major dimension of said foil member, (v) the inner edges of said depressions have sharply defined peripheral edges so as to provide effective edges, and (vi) said depressions are positioned interiorly of the outer edges of said foil member with the inner edges of said depressions defining a length of said foil member which is essentially coextensive with the length of the article to be decorated;

(b) casting a fluent clear plastic material onto said foil member while said foil member is retained in a substantially flat condition such that said plastic flows to all effective edges and forms a positive meniscus;

(c) leaving end sections of said foil member between said inner edges of said depressions and said outer edges of said foil member free of any cast fluent plastic material whereby said end sections serve as one means for securing said trim strip to the intended surface; and (d) curing said plastic composition.

17. A door decorated with a trim strip and consisting essentially of:

(a) a door having an exterior surface, an interior surface and edge surfaces joining said exterior and interior surfaces, and (b) a trim strip adhesively bonded to said door covering the total width of its exterior surface and overlapping its edge surfaces, said trim strip characterized in that;

(i) it includes a generally rectangularly shaped foil member having a length longer than the width of said door, having a lower surface and having an upper surface provided with a decoration, (ii) a partial central section of the upper surface of said foil member bears a weather-resistant and impact-resistant plastic overlay having radiused edges and providing a lens effect to said foil member;

(iii) end sections of the upper surface on each side of said partial central section having no overlay thereon, and (iv) the plastic overlaid central section of the foil member is essentially coextensive with the width of said door and the end sections which are not overlaid with said plastic overlay being wrapped around the door edges, the plastic overlaid surface of the trim strip being positioned entirely within the exterior surface of said door.

18. The door of claim 17 in which the trim strip is characterized in that:

(i) it includes a generally rectangularly shaped foil member having a lower surface and an upper surface provided with a decoration, (ii) said foil member has a length longer than the width of said door, (iii) the two longer edges of said foil member have as effective edges sharply defined peripheral edges, (iv) two thin, narrow, rectangularly shaped essentially transparent elements overlaying said foil member, (v) said transparent elements also providing effective edges, (vi) the major dimensions of said transparent elements are aligned generally transverse to the major dimension of said foil member, (vii) the shorter edges of said transparent elements are aligned in register with the longer edges of said foil member, (viii) the outer edges of said transparent elements are positioned interiorly of the outer edges of said foil member and define a length of said foil member which is essentially coextensive with the width of said door, and (ix) the upper surface of said foil member bears a weather-resistant and impact-resistant overlay having radiused edges and providing a lens effect to said decoration and formed by overcoating the upper surface of said foil member with a fluent clear plastic material which flows to all effective edges and forms a positive meniscus and curing said plastic material.

* * * * *